United States Patent [19]

Warych

[11] Patent Number: 5,056,426
[45] Date of Patent: Oct. 15, 1991

[54] STRAPPING BAND FOR AUTOMATIC STRAPPING MACHINES

[75] Inventor: Hans Warych, Gelsenkirchen, Fed. Rep. of Germany

[73] Assignee: Signode System GmbH, Dinslaken, Fed. Rep. of Germany

[21] Appl. No.: 469,906

[22] Filed: Jan. 25, 1990

[30] Foreign Application Priority Data

Jan. 26, 1989 [DE] Fed. Rep. of Germany ....... 3902240

[51] Int. Cl.$^5$ ...................... B65B 13/04; B65B 13/00; C08K 5/34; C08F 8/42
[52] U.S. Cl. ......................................... 100/26; 100/1; 524/88; 525/370
[58] Field of Search ...................... 524/88; 100/26, 1

[56] References Cited

U.S. PATENT DOCUMENTS 3,558,551 1/1971 Gilbert et al. .......................... 260/41
4,130,686 12/1978 Takahashi et al. .................. 428/294

Primary Examiner—Joseph L. Schofer
Assistant Examiner—Wu C. Cheng
Attorney, Agent, or Firm—Schwartz & Weinrieb

[57] ABSTRACT

A strapping band or binding strap for use in connection with automatic strapping or binding machines or apparatus for strapping or binding packaged articles or stacks of articles by means of at least one closed loop of the strapping band or binding strap, comprises the fabrication thereof from a suitable thermoplastic material which has a suitable nucleation agent added thereto. The agent serves as a camber effect inhibitor so as to suppress any camber effect from being imposed or impressed upon or generated within the binding strap or strapping band by means of the roller conveyors conventionally incorporated within the looping frame of the automatic strapping or binding machine or apparatus.

8 Claims, 1 Drawing Sheet

STRAPPING BAND FOR AUTOMATIC STRAPPING MACHINES

FIELD OF THE INVENTION

The present invention relates generally to binding straps used to encircle packaged articles, boxes, containers, or the like, or to similarly encircle a plurality of stacked articles, by means of one or more tensioned binding strap loops, and more particularly, to a new and improved binding strap or band which is fabricated from a thermoplastic material and which additionally contains a nucleation agent which serves as a camber effect inhibitor for suppressing any camber effects, as viewed in a top plan view, which may be impressed upon the binding strap or band by means of the automatic strapping or binding machine.

BACKGROUND OF THE INVENTION

Automatic strapping or binding machines, comprising a looping frame and a roller conveyor, are of course known and used for discharging a strapping band or binding strap and for securing the band or strap about packaged articles, boxes, containers, or the like, or a plurality of stacked articles, by means of one or more tensioned binding strap loops. An example of such an apparatus or machine is disclosed within German Patent Publication DE-OS 31 40 577.

In accordance with such conventional strapping or binding techniques, the strapping band or binding strap is initially unwound from a coiled stock of such band or strap, and during a strapping or binding operation, a leading end of the band or strap is inserted into the looping frame of the apparatus or machine by means of the roller conveyor, after a portion of the binding strap or strapping band has encircled the packaged article or stacked articles, so as to be united with or secured to a downstream portion of the band or strap unwound from the coiled stock whereby a strapping or binding loop is formed about or around the packaged article or stack of articles to be bound. Upon proper tensioning of the binding strap or strapping band, the leading end of the binding strap or strapping band is in fact secured to or fixedly united with the downstream portion of the strapping band or binding strap whereupon the downstream portion of the band or strap is severed from the residual coiled stock of the binding strap or strapping band so as to complete the binding of the packaged article or stack of articles. The process is then repeated with respect to additional packaged articles or stacks of articles.

The foregoing automation techniques demand that the binding or strapping process proceeds in accordance with the noted sequence of process steps in a manner or mode which is effectively free from irregularities, jammings, slowdowns, down periods, or the like, so as to in fact achieve a high cycle rate of production. In practice, however, such irregularities or other operational defects do in fact frequently occur because, for example, the leading end of the strapping band or binding strap often becomes jammed within the looping frame. Investigations conducted in connection with such automation apparatus or machinery have demonstrated or revealed the fact that such irregularities or operational breakdowns are caused by means of the looping frame itself. In particular, the roller conveyor represents or serves as a rolling mill which imparts a predetermined percentage reduction to or upon the strapping band or binding strap as the same passes through the roller conveyor, however, the aforenoted percentage reduction imposed upon the binding strap or strapping band is non-uniform because of tolerance characteristics. These results are especially true if the roller conveyor comprises corrugated rolls in order to avoid undesired slippage. As a result of the varying percentage reductions achieved by means of the roller conveyor rolls in connection with or upon opposite longitudinally edges of the strapping band or binding strap, the latter is rolled with a resulting camber effect, with the camber radius disposed within the plane of the drawn strapping band or binding strap.

As can therefore be readily appreciated, the aforenoted camber effect causes the leading end of the strapping band or binding strap to collide with or encounter the interior walls of the looping frame guide devices as the leading end of the strap or band is inserted or introduced into the looping frame. As a result of such collisions or encounters between the leading end of the binding strap or strapping band and the looping frame guide devices, the foregoing irregularities, jammings, or the like, occur whereby the binding or strapping apparatus or machinery is necessarily shut down, slowed down, operated in a reverse manner in order to attempt to alleviate the jammed leading end of the binding strap or strapping band, or the like, all of which in fact militates against or in fact results in the achievement of a substantially low cycle rate of production.

OBJECT OF THE INVENTION

Accordingly, it is the primary object of the present invention to provide a new and improved strapping band or binding strap which can be used within conventional automatic strapping or binding machines, apparatus, or equipment whereby the aforenoted binding or strapping techniques or processes can in fact be conducted and achieved without the occurrence of the aforenoted irregularities, jammings, stoppages, slowdowns, shut-downs, or the like.

SUMMARY OF THE INVENTION

The foregoing and other objectives are achieved in accordance with the present invention by means of the provision of a new and improved binding strap or strapping band which is fabricated from a thermoplastic material and which additionally includes or contains a nucleation agent which serves as a camber effect inhibitor for suppressing any camber effects, as viewed in a top plan view, which may be impressed upon the binding strap or strapping band by means of the roller conveyor structure or components of the looping frame of the automatic strapping or binding machine. The thermoplastic material from which the binding strap or strapping band is drawn or fabricated is preferably polypropylene, and while the addition or introduction of nucleation agents to or into a thermoplastic material during the processing thereof is in principle well known per se, the results, effects, and ramifications of such addition or introduction of such nucleation agents to or into the thermoplastic material comprising the binding strap or strapping band per se are entirely unexpected. More particularly, it is known that during solidification of the thermoplastic materials, the nucleation agents serve as nuclei formers and enhance the degree of crystallization as well as the packing density of the crystallites within the formation. Nucleation agents have in fact been previously used in the manufacture of plastic films, from which packaging bags are fabricated, in order to endow the latter with a requisite amount of stiffness, however, to the best of the knowledge of the inventor, such nucleation agents have never heretofore been used in connection with thermoplastic materials being used for the fabrication of binding straps or strapping bands, and surprisingly, the addition of such nucleation agents to the thermoplastic materials which are ultimately fabricated into the strapping bands or binding straps, and wherein the binding straps or strapping bands are ultimately conveyed through the roller conveyors of the looping frame of the automatic strapping or binding machine, serves to suppress or inhibit the development or generation of the camber effect within the strapping band or binding strap as the same passes or is conveyed through the roller conveyors of the looping frame of the automatic strapping or binding machine. The particular, predetermined, or proper amount of the particular or predetermined or suitable nucleation agent, to be used in connection with or incorporated within the thermoplastic material from which the binding strap or strapping band is fabricated, can of course be determined experimentally, and if the thermoplastic material from which the strapping band or binding strap is fabricated is propylene, it is recommended or preferred that a metallo-organic compound, such as, for example, copper-phthalocyanine, be used as the nucleation agent.

BRIEF DESCRIPTION OF THE DRAWINGS

Various other objects, features, and attendant advantages of the present invention will become more fully appreciated as reference is made to the following detailed description, when considered in connection with the accompanying drawings, in which like reference characters designate like or corresponding parts throughout the several views, and wherein.

DETAILED DESCRIPTION OF THE PREFERRED EMBODIMENT

Figure 1:
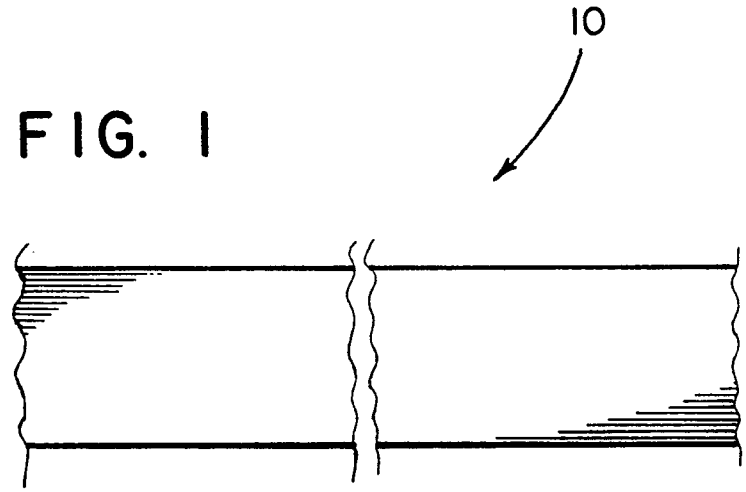
FIG. 1 is a top plan view of a portion of the strapping band or binding strap fabricated in accordance with the present invention.

Referring now to the drawings, and more particularly to FIG. 1 thereof, there is shown a strapping band or binding strap section generally designated by means of the reference character 10, which such strap or band has been fabricated in accordance with the teachings of the present invention. More particularly, the strap or band 10 of the present invention is fabricated from a suitable thermoplastic material, such as, for example, polypropylene, and in accordance with the teachings of the present invention whereby an improved strapping band or binding strap is in fact achieved, the band or strap also contains a nucleation agent which, in effect, acts as a camber effect inhibitor so as to effectively suppress or inhibit any camber effect from being imposed or impressed upon the binding strap or strapping band by means of the roller conveyors of the strapping or binding machine or apparatus. Within the framework or parameters of the present invention, there are of course various possibilities or modifications which may be incorporated into or employed within the strapping band or binding strap of the present invention when forming or fabricating the same. More particularly, when the thermoplastic material utilized to fabricate the binding strap or strapping band 10 of the present invention is polypropylene, it is recommended or preferred that a metallo-organic compound be used as the nucleation agent, such as, for example, copper-phthalocyanine. According to the preferred embodiment of the invention, the polypropylene from which the strapping band or binding strap 10 is fabricated possesses a degree of crystallization of more than 55%, and preferably approximately 60%, and a drawing ratio of 1:15 to 1:20, with a preferable ratio being approximately 1:20.

Figure 2:
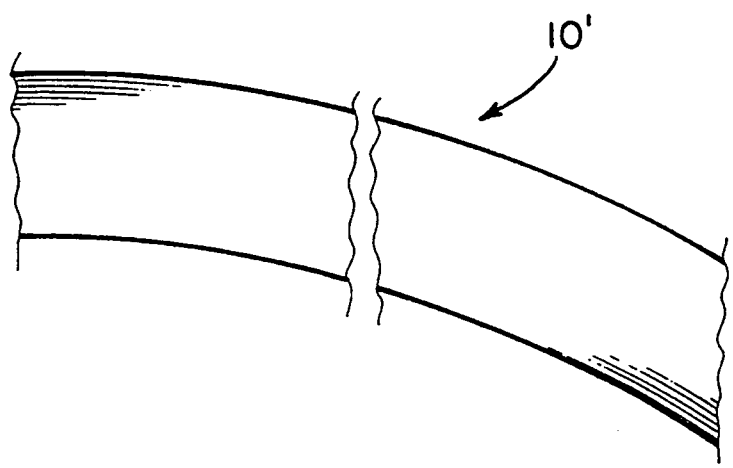
FIG. 2 is a top plan view, corresponding to that of FIG. 1, showing, however, a portion of a conventional strapping band or binding strap.

With reference being made to FIG. 2 which illustrates a conventional binding strap or strapping band 10', wherein the same is fabricated from a suitable thermoplastic material which does not contain a nucleation agent as taught by means of the present invention, it is quite apparent that the conventional strapping band or binding strap 10' exhibits a pronounced or significant camber effect which is generated within the strap or band after the same has passed through the roller conveyors of the looping frame of the automatic strapping or binding machine or apparatus. The curvature of the band or strap 10' shown in FIG. 2 is admittedly exaggerated, however, such has been illustrated in this manner simply for illustrative purposes whereby the present invention could be readily appreciated and understood.

Obviously, many modifications and variations of the present invention are possible in light of the above teachings. It is therefore to be understood that within the scope of the appended claims, the present invention may be practiced otherwise than as specifically described herein.

I claim:

1. In combination with an automatic strapping machine having a looping frame and a roller conveyor for processing a strapping band during a strapping operation, said strapping band comprising a drawn thermoplastic material which normally exhibits an arcuate camber within the plane of said band as a result of being processed within said automatic strapping machine, the improvement comprising:

the addition of a nucleation agent to said thermoplastic material so as to serve as a camber effect inhibitor in order to suppress any camber effect imposed upon said strapping band by said automatic strapping machine.

2. A strapping band according to claim 1, wherein: said thermoplastic material comprises polypropylene.

3. A strapping band according to claim 1, wherein: said nucleation agent comprises a metallo-organic compound.

4. A strapping band according to claim 1, wherein: said nucleation agent comprises copper-phthalocyanine.

5. A strapping band according to claim 2, wherein: said polypropylene has a degree of crystallization of more than 55% and a drawing ratio within the range of 1:15 to 1:20.

6. A strapping band according to claim 5, wherein: said degree of crystallization of said polypropylene is approximately 60%.

7. A strapping band according to claim 5, wherein: said drawing ratio of said polypropylene is approximately 1:20.

8. A strapping band according to claim 3, wherein: said nucleation agent comprises copper-phthalocyanine.

* * * * *